United States Patent [19]

Opheij et al.

[11] Patent Number: 5,579,298

[45] Date of Patent: Nov. 26, 1996

[54] OPTICAL SCANNER HAVING SYMMETRY ABOUT AN OBLIQUE DIVIDER

[75] Inventors: Willem G. Opheij; Jozef P. H. Benschop; Heidrun Steinhauser, all of Eindhoven, Netherlands

[73] Assignee: U.S. Philips Corporation, New York, N.Y.

[21] Appl. No.: 607,623

[22] Filed: Feb. 27, 1996

Related U.S. Application Data

[63] Continuation of Ser. No. 390,158, Feb. 16, 1995, abandoned, which is a continuation of Ser. No. 103,942, Aug. 9, 1993, abandoned.

[30] Foreign Application Priority Data

Aug. 12, 1992 [EP] European Pat. Off. ............. 92202487

[51] Int. Cl.[6] ....................................................... G11B 7/00
[52] U.S. Cl. ........................................... 369/112; 369/109
[58] Field of Search ............................ 369/44.37, 44.23, 369/44.24, 44.11, 44.12, 109, 110, 124, 44.41, 44.42

[56] References Cited

U.S. PATENT DOCUMENTS

| | | | |
|---|---|---|---|
| 4,665,310 | 5/1987 | Heemskerk | 369/44.12 |
| 4,724,533 | 2/1988 | Ohara et al. | 369/44.12 |
| 4,733,065 | 3/1988 | Hoshi et al. | 369/44.12 |
| 4,829,506 | 8/1989 | Bressers et al. | 369/44.37 |
| 4,945,529 | 7/1990 | Ono et al. | 369/44.12 |
| 5,036,504 | 7/1991 | Ono et al. | 369/44.12 |
| 5,062,098 | 10/1991 | Hori et al. | 369/44.12 |
| 5,065,380 | 11/1991 | Yokota | 369/44.12 |
| 5,111,449 | 5/1992 | Kurata et al. | 369/44.12 |
| 5,231,620 | 7/1993 | Ohuchida | 369/44.12 |
| 5,253,237 | 10/1993 | Miyake et al. | 369/44.12 |
| 5,270,996 | 12/1993 | Ono | 369/112 |
| 5,391,865 | 2/1995 | Kurata et al. | 369/44.12 |

FOREIGN PATENT DOCUMENTS

| | | | |
|---|---|---|---|
| 0228620 | 7/1987 | European Pat. Off. | |
| 0300570 | 1/1989 | European Pat. Off. | |
| 0372629 | 6/1990 | European Pat. Off. | |
| 0409469 | 1/1991 | European Pat. Off. | |
| 0554092 | 8/1993 | European Pat. Off. | |
| 63-228432 | 9/1988 | Japan | 369/44.12 |
| 5054411 | 3/1993 | Japan. | |

*Primary Examiner*—Nabil Z. Hindi
*Attorney, Agent, or Firm*—Richard A. Weiss

[57] ABSTRACT

A device for optically scanning an information plane (2) having tracks (5). Radiation supplied by a radiation source (7) is focused on the information plane by an objective system (8). The beam reflected by the information plane is incident on a dividing element, for example, a grating (12), which divides the beam into two halves along a dividing line (17). Two sub-gratings (15, 16) at both sides of the dividing line, respectively, each form a sub-beam from one half of the beam, which sub-beams are detected by a detection system (10), which produces detection signals therefrom. A focus error signal is generated from the detector signals. According to the invention, modulation of the focus error signal by the track structure will be minimal if the dividing line (17) is located at an angle between 15° and 80° to the direction of the tracks.

21 Claims, 8 Drawing Sheets

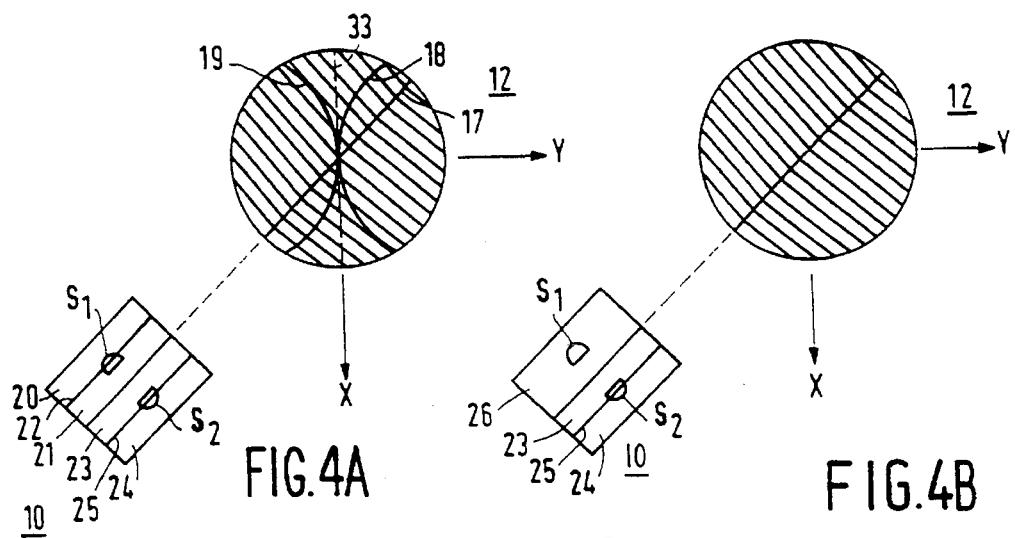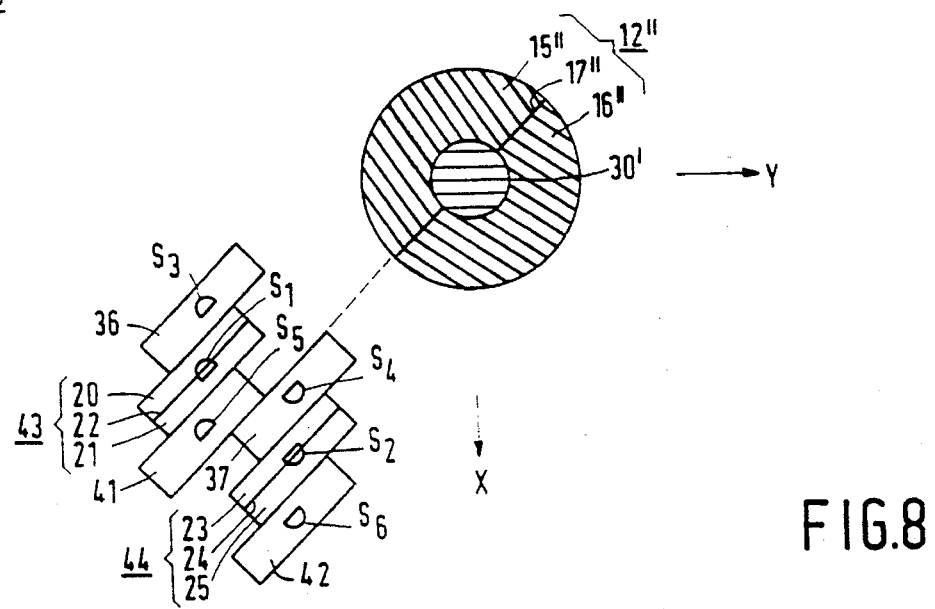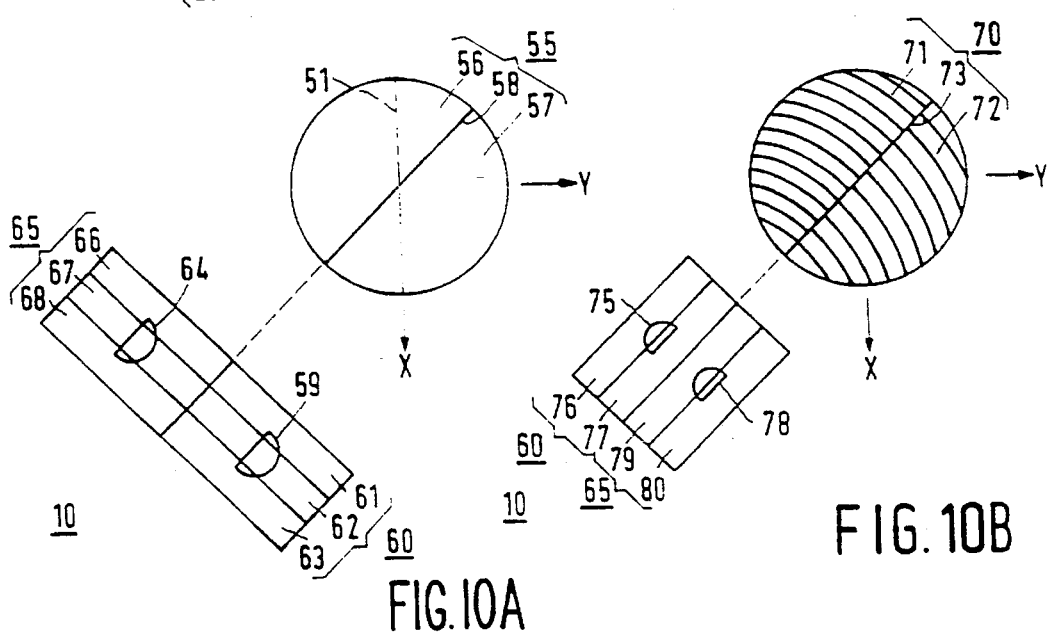

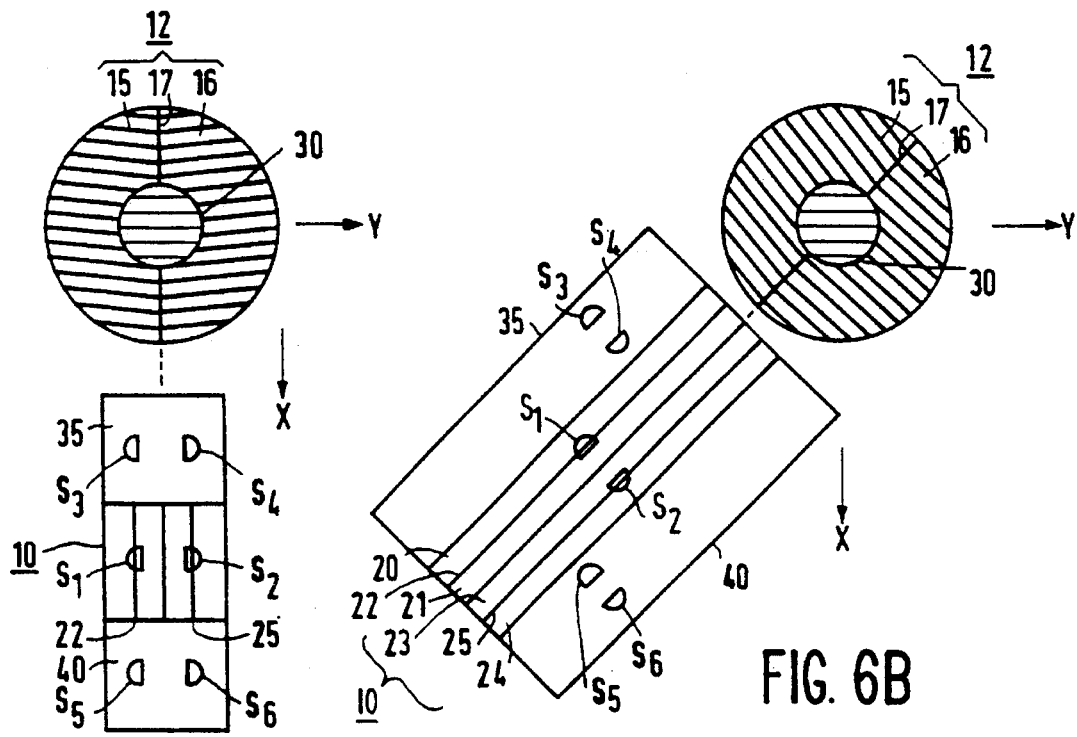
FIG. 6A
FIG. 6B
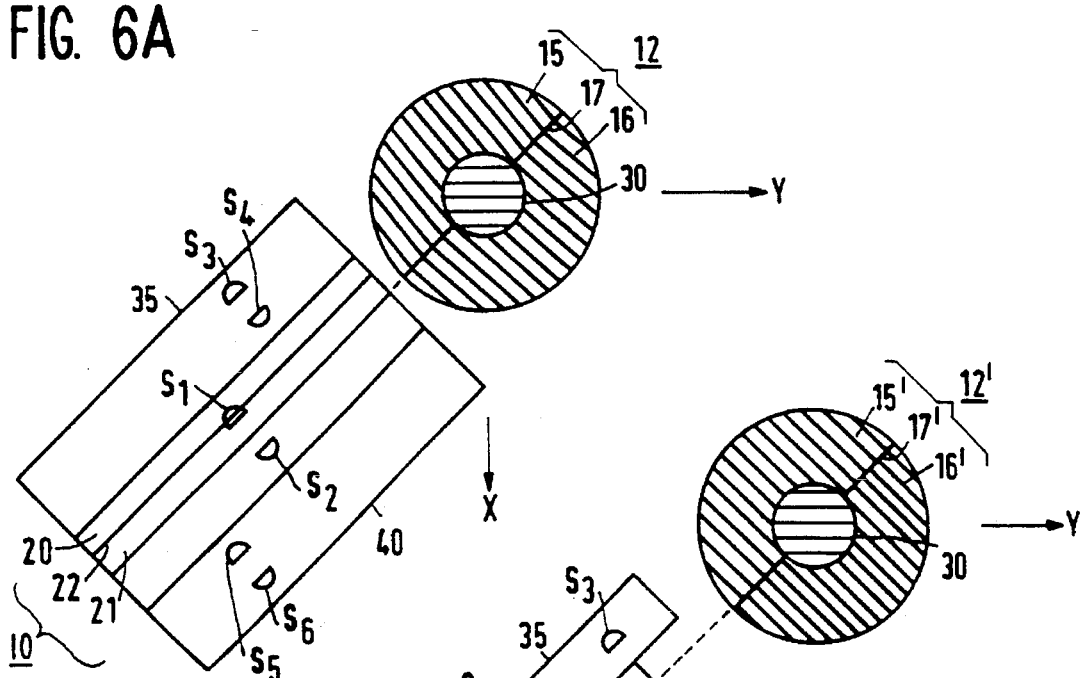
FIG. 6C
FIG. 6D

OPTICAL SCANNER HAVING SYMMETRY ABOUT AN OBLIQUE DIVIDER

This is a continuation of application Ser. No. 08/390,158, filed on Feb. 16, 1995, which is a continuation of application Ser. No. 08/103,942, filed on Aug. 9, 1993.

BACKGROUND OF THE INVENTION

The invention relates to a device for optically scanning tracks in a radiation-reflecting information plane, which device comprises a radiation source for supplying a scanning beam, an objective system for focusing the scanning beam to a scanning spot on the information plane, a dividing element having two sub-areas located symmetrically at both sides of a dividing line and arranged in the optical path of radiation from the information plane for splitting at least a part of the radiation into two scanning sub-beams, and a radiation-sensitive detection system. (The above-mentioned symmetry is understood to mean that the surfaces of the sub-areas are located symmetrically at both sides of the dividing line.)

A device of this type, which in principle is suitable for reading and writing information from and in, respectively, an optical record carrier, is known from U.S. Pat. No. 4,665,310. The dividing element in this device is a diffraction element i.e., grating having two sub-gratings at both sides of a dividing line. The diffraction element fulfills two functions. In the first place, the grating ensures that a part of the radiation reflected by the information plane is deflected from the path of the radiation emitted by the radiation source so that a detection system can be placed in the path of the reflected radiation. In the second place, the grating splits the reflected scanning beam into two scanning sub-beams which are required for generating a focus error signal in accordance with the Foucault method, i.e., a signal which is proportional to a deviation between the focusing plane of the scanning beam and the information plane.

In this device not only a focus error signal but also a tracking error signal must be generated. A tracking error is a deviation between the center of the scanning spot and the centerline of the track to be scanned. In the device described in U.S. Pat. No. 4,665,310, a tracking error is detected by means of the same detection systems with which a focus error is also detected.

To this end, the diffraction element in the known device is oriented in such a way that the dividing line between the sub-gratings is parallel to the effective track direction, i.e., the projection on the diffraction element of the line tangent to the tracks at the location of the scanning spot. The quantity of radiation in each scanning sub-beam deflected by the sub-gratings is determined by means of two detectors arranged in one of these sub-beams. The tracking error signal is obtained by determining, for each detector, a signal which is proportional to the incident radiation and by subtracting these signals from each other. This way of generating the tracking error signal is also referred to as the push-pull method.

A drawback of the known device is the radial to focus crosstalk. This is the phenomenon of the focus error signal being dependent on the transversal position of the scanning spot with respect to the tracks, also referred to as the radial position in the case of a disc-shaped record carrier. The crosstalk gives rise to a deviation between the information plane and the focusing plane of the scanning spot, which is set by the control of the objective lens. The magnitude of this focus offset is dependent on the transversal position of the scanning spot with respect to the track to be scanned. The crosstalk further influences the ratio between the magnitude of the focus error signal and the magnitude of the focus error. Dependent on the transversal position of the scanning spot, the loop gain in the focus control loop may vary by a factor of more than four. The crosstalk problems become most clearly manifest when the scanning spot is moved transversally across the tracks, for example when a track to be scanned is being searched. The transversal position of the scanning spot is then controlled by means of information read from the information plane during searching, for example, address information or the number of passed tracks. During searching the offset causes an oscillation in the axial position of the scanning spot, hence a periodically changing defocusing of the scanning spot so that the information in the information plane is not read satisfactorily and consequently the searching process is disturbed. The loop gain changes may lead to a complete loss of focus so that the device must be restarted.

SUMMARY OF THE INVENTION

It is an object of the present invention to provide a device having a reduced radial to focus crosstalk. A device according to the invention is characterized in that the angle between the dividing line and the effective track direction is between 15° and 80°. It has been found that the crosstalk is rapidly reduced when the above-mentioned angle increases from 0° so that in principle this angle is made as large as possible. However, in the case of angles of more than 80° the crosstalk increases again, as will be explained hereinafter. Moreover, if the push-pull method is used, the range between 80° and 90° is excluded because a tracking error signal of sufficient magnitude cannot be generated in this range in accordance with this method.

A preferred embodiment of the device according to the invention is characterized in that the angle is between 30° and 60°. Outside this range, the magnitude of the crosstalk is greatly dependent on the positions of the detectors along the chief ray of the sub-beams, i.e., the axial positions. Due to the positioning tolerances during manufacture of the device, it cannot be predicted how much crosstalk will occur. In addition to the previously mentioned small crosstalk, the range between 30° and 60° has the further advantage that the crosstalk depends to a slight extent on the axial positions of the detectors so that the device has a greater positioning tolerance for the detection systems.

Another embodiment of the device according to the invention is characterized in that the dividing element is a prismatic dividing plate in which each sub-area consists of a prism face. The prismatic dividing plate has the advantage that it generates the sub-beams from the beam incident on the dividing plate with great efficiency.

Still another embodiment of the device according to the invention is characterized in that the dividing element is a diffraction element in which each sub-area consists of a sub-grating. If the dividing element is a grating, it may perform two functions, i.e., deflecting a part of the radiation from the information plane from the scanning beam to the detection system and splitting the deflected radiation into two sub-beams.

A further embodiment of the device according to the invention in which the tracks in the information plane are tracked by means of two extra beams is characterized in that a further diffraction element having substantially straight grating lines is arranged in the optical path of the scanning beam between the radiation source and the objective system for splitting the beam emitted by the radiation source into the scanning beam and two auxiliary beams, which auxiliary beams are focused by the objective system to two further radiation spots on the information plane, and in that the device, further comprises two further detection systems, each being associated with one of the auxiliary beams reflected by the information plane. The wavelength of the radiation emitted by the radiation source is dependent on, inter alia, the temperature of the source. The resultant wavelength variations cause offsets of the radiation spots on the detection systems. Alignment of the optical system during assembly of the device also causes offsets of the radiation spots on the detection systems. By using the separate elements for generating a focus error signal on the one hand and a tracking error signal on the other hand, with the dividing element for generating the focus error signal being oriented according to the invention, a great degree of freedom in the design of the detection systems is obtained. Notably the length of the detection systems and their positioning can be chosen in such a way that the wavelength variations of the radiation source and the offset caused by the alignment do not result in considerable changes of the generated servosignals.

It is to be noted that a device comprising two diffraction elements is known per se from European Patent Application No. 0 372 629. However, in this device the angle between the dividing line of the first grating and the line tangent to the tracks is 0° or 90° so that there is either a considerable radial to focus crosstalk, or the tracking error signal cannot be generated by means of the push-pull method.

An embodiment of the device comprising two diffraction elements is characterized in that the detection systems for the auxiliary beams are located at both sides of the detection system for the scanning beam in a direction transverse to the perpendicular from the center of the detection system for the scanning beam to the optical axis of the zero-order beam of the diffraction element. This configuration provides the possibility of giving the separate detection elements which may constitute the detection systems an elongated form in the direction in which the beams are displaced when the wavelength is changed. This results in a great tolerance for wavelength changes of the radiation source so that correct servo-signals can also be obtained at larger wavelength variations.

To achieve the same advantages in a device in which the radiation spots of the scanning beam and the auxiliary beams are located relatively close together on the information plane, the device is preferably characterized in that the detection systems for the scanning beam, the first auxiliary beam and the second auxiliary beam comprise a first and second, a third and fourth, and a fifth and sixth detector, respectively, the six detectors being juxtaposed in the sequence: three, one, five, four, two, six, viewed in a direction transverse to the perpendicular from the center of the detection system for the scanning beam to the optical axis of the zero-order beam of the diffraction element.

A special embodiment of the device according to the invention is characterized in that the detection system for the scanning beam comprises two detectors, at least one of which is divided by means of a bounding line into two detection elements for detecting a scanning sub-beam. An advantage of a configuration in which there is only one detector with such a bounding line, is that the alignment of the detection system with respect to the dividing element is considerably simplified with respect to the situation in which there are two detectors with such a bounding line.

A preferred embodiment of this device according to the invention is characterized in that the bounding line between the detection elements is substantially directed towards the optical axis of the zero-order beam of the diffraction element. If the sub-beam associated with the detector is focused on the bounding line, the focus spot will move along the line when the wavelength of the radiation is changed, so that the quantity of radiation incident on the detection elements at both sides of the bounding line remains equal. In a first approximation, the signals derived from these detection elements are independent of the radiation wavelength.

Another special embodiment of the device according to the invention is characterized in that the sub-areas have different optical strengths. Consequently, the focal points of the sub-beams generated by the sub-areas will be located at different distances from the dividing element. This provides the possibility of generating the focus error signal by means of the beam-size method in which there is a small radial to focus crosstalk.

If the dividing element and/or the further diffraction element are reflecting, the optical path can be folded so that a compact construction of the device is possible. These and other aspects of the invention will be apparent from and elucidated with reference to the embodiments described hereinafter.

BRIEF DESCRIPTION OF THE DRAWING

In the drawings

FIG. 4A shows a grating and detector configuration for the single-Foucault method, FIG. 4B shows a grating and detector configuration for the double-Foucault method, FIG. 6A shows a known grating and detector configuration for the three-beam double-Foucault method, FIG. 6B shows a grating and detector configuration according to the invention for the three-beam double-Foucault method, FIG. 6C shows a grating and detector configuration for the three-beam single-Foucault method, FIG. 6D shows an alternative configuration for the three-beam single-Foucault method, FIG. 8 shows a grating and detector configuration for the three-beam push-pull method, FIG. 10A shows a configuration with a prismatic dividing plate and in a detection system for the beam-size method, and FIG. 10B shows a configuration with a grating and detection system for the beam-size method.

(Identical reference numerals in the different Figures denote identical elements.)

DESCRIPTION OF THE PREFERRED EMBODIMENT

Figure 1:
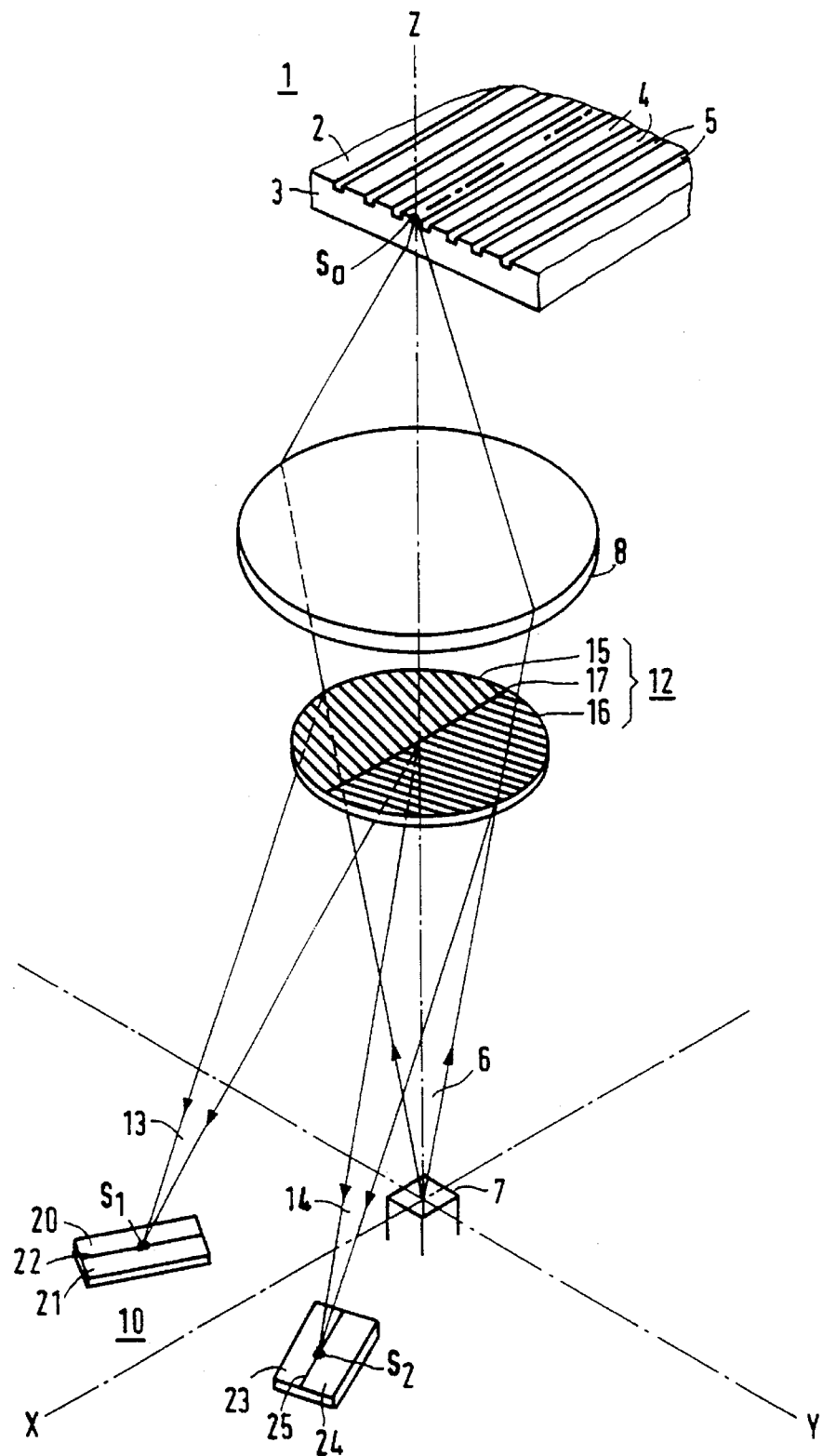
FIG. 1 shows diagrammatically a known device.

FIG. 1 shows a small part of an optical record carrier 1 with a radiation-reflecting information plane 2 and a transparent substrate 3. This Figure shows a number of tracks 4, separated or not separated by intermediate areas 5, for example, grooves. The tracks extend in the X direction of a system of axes XYZ shown in the Figure, in which the information plane is parallel to the X-Y plane. Information is recorded on the record carrier in the form of optically readable areas, ordered in the tracks and having a width equal to or smaller than the width of the track. FIG. 1 shows some of these areas. The areas may have a shape of, for example pits or bumps or areas having a reflection different from that of its surroundings, or magnetic domains with a direction of magnetization different from that of its surroundings. The information plane is scanned by a scanning beam 6 emitted by a radiation source 7, for example, a diode laser whose center coincides with the origin 0 of the system of axes XYZ. This beam is focused on the information plane to a small scanning spot $S_a$ by an objective system 8 diagrammatically shown by means of a single lens. A separate collimator lens may precede the objective system. If the record carrier is disc-shaped, the tracks can be scanned by rotating the record carrier about an axis parallel to the Z axis. The entire information plane is scanned by moving the record carrier and the optical system of source, lens and detection system 10 in the radial direction, i.e., the Y direction, with respect to each other.

It must be possible to detect the beam reflected by the information plane and modulated by the information and the track structure, for which purpose this beam must be separated from the scanning beam towards the information plane. To this end the device may be provided with a diffraction element 12 in the form of a grating which deflects the reflected beam from the path of the projected beam 6. For Foucault focus error detection, the reflected beam must be split into two scanning sub-beams 13 and 14, and the detection system 10 must comprise, for example, two pairs of detection elements 20, 21 and 23, 24, respectively, the first pair 20, 21 cooperating with the first sub-beam 13 and the second pair 23, 24 cooperating with a second sub-beam 14.

As described in U.S. Pat. No. 4,665,310, the beam separation and the beam splitting can be performed by one diffraction element. This element 12 splits the beam reflected by the information plane and passing through the objective system 8 into a non-diffracted zero-order sub-beam and a plurality of sub-beams of the first and higher orders. Preferably, the first-order sub-beams are diffracted towards the detector system 10. The part of the radiation emitted by the source 7 and being incident on the detection system can be adjusted by a choice of the grating parameters, notably the ratio between the width of the grating grooves and that of the areas between the grating grooves and the depth and the shape of the grooves.

The known grating 12 shown in FIG. 1 comprises two sub-gratings 15 and 16 at both sides of a dividing line 17 which is parallel to the X axis. The grating lines in each sub-grating shown in the Figure are parallel, while the lines of the first sub-grating extend at a first angle and those of the second sub-grating extend at a second, equally large but opposite angle to the dividing line 17. The sub-gratings lines of the gratings actually used often have a substantially hyperbolic shape and are substantially parallel. Such gratings may also have an optical strength, for example if there is a height difference between the radiation source and the detection system 10. The sub-beams 13 and 14 diffracted by the sub-gratings 15 and 16 each have a direction substantially perpendicular to the grating lines of the associated sub-grating. The radiation spots $S_1$ and $S_2$ formed by the sub-beams 13 and 14 in the X-Y plane are offset with respect to each other in the Y direction and are located symmetrically with respect to the X axis. The detection system 10 for detecting the sub-beams comprises two detectors, one detector comprising detection elements 20 and 21 at both sides of a bounding line 22, and one detector comprising the detection elements 23 and 24 at both sides of a bounding line 25. The detection elements are arranged in such a way that the centers of gravity of the radiation spots $S_1$ and $S_2$ are on the respective bounding lines 22 and 25 when the scanning beam 6 is correctly focused on the information plane 2. When a focus error occurs, the centers of gravity of the radiation distribution of the spots $S_1$ and $S_2$ are displaced either towards or away from each other, dependent on the direction of the focus error. If the output signals of the detection elements 20, 21, 23 and 24 are represented by $S_{20}$, $S_{21}$, $S_{23}$ and $S_{24}$, respectively the focus error signal $S_f$ is given by:

$$S_f=(S_{20}-S_{21})+(S_{24}-S_{23}).$$

This known method of generating the focus error signal is referred to as the double-Foucault method because of the detection of each sub-beam by means of a pair of detection elements. The signal which is proportional to the information which has been read, i.e., the information signal $S_i$, is given by:

$$S_i=S_{20}+S_{21}+S_{23}+S_{24}.$$

Figure 2:
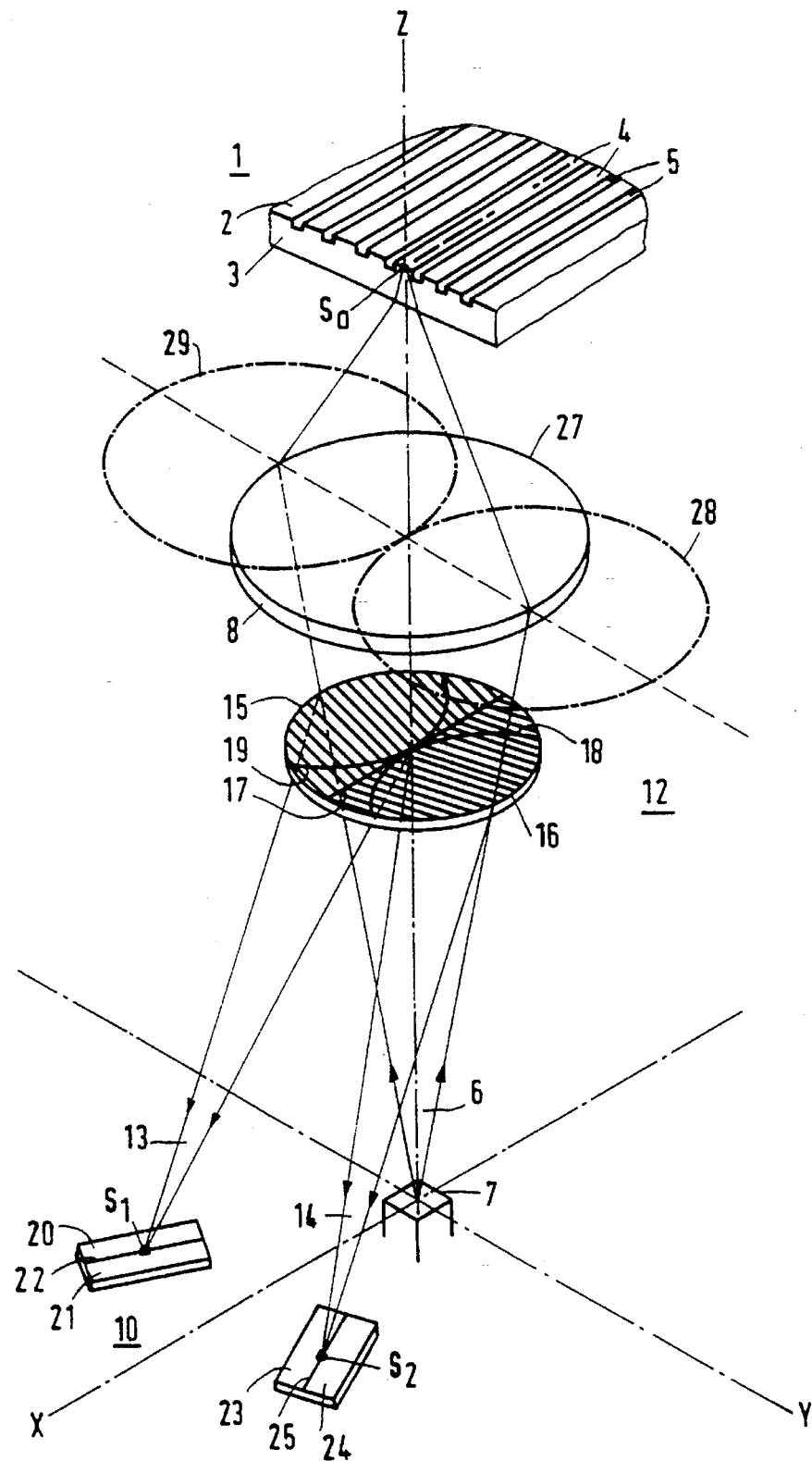
FIG. 2 shows the origin of the radial to focus crosstalk in the known device.

It is found that the magnitude of the focus error signal $S_f$ does not only depend on the magnitude of the focus error but also on the radial position of the scanning spot, i.e., the position in the Y direction. The cause of this radial to focus crosstalk will be elucidated with reference to FIG. 2. The scanning beam 6 incident on the information plane 2 is not only reflected, but also diffracted, by the tracks in the information plane. The diffraction in the Y direction, i.e., perpendicular to the track direction, will hereinafter be considered, i.e., the diffraction results in a zero-order, two first-order and further, weaker higher-order beams being reflected from the information plane. The zero-order beam returns along the path of the incident beam. The first and higher-order beams are deflected in the Y direction perpendicular to the tracks extending in the X direction. The angle at which the beams are deflected is determined by the track period, while the strength is generally determined by the geometry of the tracks 4 and the intermediate areas 5 and by the geometry of the areas in which the information has been recorded. FIG. 2 shows the cross-section of the $0^{th}$, $+1^{st}$ and $-1^{st}$ order beams in the plane of the objective system 8 by means of the reference numerals 27, 28 and 29, respectively. The device of FIG. 2 has such an optical configuration that the +1 and −1 beams are tangent to each other in the center of the lens. The parts of the reflected beams falling outside the objective system 8 will be lost. The intensity of the radiation in the overlap areas of the $0^{th}$ and $1^{st}$ order beams depends on the intensity of each beam individually and on the phase difference between the two beams. The phase difference is dependent on the position of the scanning spot $S_a$ with respect to the tracks. When the scanning spot scans across the tracks in the Y direction, the phase difference between $0^{th}$ and "$+1^{st}$ order" beams and between the $0^{th}$ and $-1^{st}$ order beams changes continuously. Consequently, intensity differences arise between the overlap areas. These intensity variations allow the generation of a tracking error signal indicating how far the center of the scanning spot is remote from the centerline of the track to be scanned.

The positions of the overlap areas at the location of the grating 12 are denoted by means of the lines 18 and 19. The tracking error can now be generated by means of the detection elements 20, 21, 23 and 24 in accordance with the push-pull method. The tracking error signal $S_t$ is then given by:

$$S_t = (S_{20} + S_{21}) - (S_{23} + S_{24}).$$

The tracking error signal is maximum when the dividing line 17 of the grating 12 is parallel to the tracks 4 as is shown in FIG. 2. In that case all radiation in an overlap area of the $0^{th}$ order beams and a $1^{st}$ order beam bounded by the circle 15 and the arcs 18 and 19 of the circle is directed towards one detector. If the dividing line angle, i.e., the angle between the dividing line 17 and the effective track direction is larger than 0°, each detector will receive radiation from the two overlap areas. If the dividing line angle increases, the value of the tracking error signal $S_t$ will decrease until the signal becomes zero at a dividing line angle of 90° at which each detector receives half the radiation from each overlap area. At a dividing line angle of 80° or less, a usable tracking error signal can still be generated.

The presence of the $0^{th}$ and $1^{st}$ order diffraction beams in the beam which is split into the two sub-beams 13 and 14 by the grating 12 provides the possibility of generating a tracking error, but also causes radial to focus crosstalk. The phase differences in the overlap areas which are dependent on the tracking error cause, as it were, tilts or curvatures of the wavefronts of the $+1^{st}$ and $-1^{st}$ order beams incident on the grating, causing variations in the angles at which the sub-beams 13 and 14 are diffracted by the grating. Consequently, the radiation spots $S_1$ and $S_2$ are offset transversely to the bounding lines 22 and 24, while the scanning beam is correctly focused on the information plane. This offset is interpreted as a focus error signal, whereas there is actually no focus error. The value of this quasi-focus error signal, also referred to as focus offset, depends on the geometry of the tracks and on the position of the scanning spot in the X direction. Moreover, the diffraction beams influence the ratio of the value of the focus error signal and the value of the focus error, i.e., the sensitivity of the focus error detection. The influence of the above-mentioned effects of the diffraction beams on the focus error signal is referred to as radial to focus crosstalk because of the dependence of the intensity and the phase of the radiation in the overlap areas on the radial position of the scanning spot.

The crosstalk is maximum in the configuration shown in which the dividing line 17 is parallel to the tracks 4. If the dividing line angle is larger than 0°, each detector receives radiation from the two overlap areas and the crosstalk is found to be smaller. With a small increase of the dividing line angle from 0° the crosstalk decreases rapidly so that with a dividing line angle of 15° the focus error signal has a quality which is better than at 0°. In contrast to the general assumption, it has been found that the crosstalk is not minimum at a dividing line angle of 90°, but at a smaller angle. The size of the angle at which there is a minimum crosstalk is dependent on the geometry of the tracks and on the optical parameters of the radiating scanning beam. In accordance with the invention, the dividing line angle is chosen in the range between 15° and 80°, with the additional advantage that a tracking error signal can be generated in the entire range by means of the push-pull method.

Figure 3:
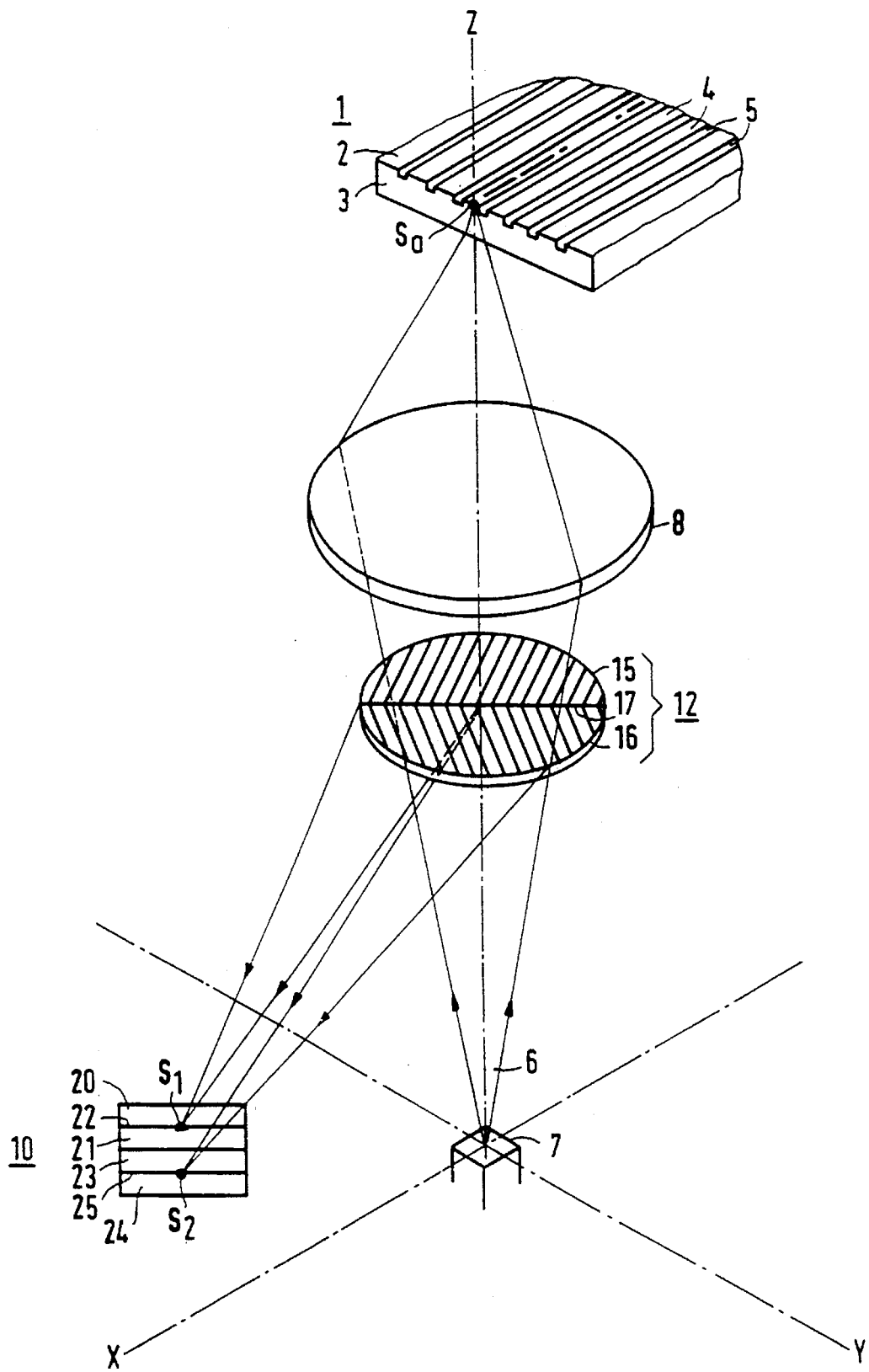
FIG. 3 shows a device according to the invention, having one grating.

The crosstalk is also dependent on the distance between the detectors and the grating. It has been found that this dependence is minimal if the dividing line angle is between 30° and 60°. This range has the additional advantage that the crosstalk itself is small in this range. The minimum crosstalk is around a dividing line angle of 45° for different devices and record carriers. An embodiment of the device according to the invention with a dividing line angle of 45° is shown in FIG. 3. In FIG. 3, the detection system 10 for the scanning beam is shown as a unit of four juxtaposed detection elements. Similarly as in the devices shown in FIGS. 1 and 2 and as known from European Patent Application No. 0 372 629, the bounding lines 22 and 25 are directed substantially towards the radiation source 7. This has been done with a view to possible changes of the wavelength of the radiation generated by the laser diode, which changes may be caused by, for example a change of the temperature of or of the current through the laser diode. Due to the wavelength-dependent behavior of the grating 12, the radiation spots $S_1$ and $S_2$ are offset towards the point of convergence of the zero-order beam of the grating or away from this point when the wavelength is changed. The point of convergence of the zero-order beam coincides with the center of the radiation source 7 in the configuration shown. A second effect of a change of the radiation wavelength is that the operation of the objective system is influenced. The resultant deviation in the focus error detection may be compensated for by giving the bounding lines slightly different directions than the lines through the center of the radiation source. In some devices a satisfactory compensation is obtained when the bounding lines 22 and 25 are both parallel to the line extending from the center of the detection system 10 to the radiation source. As a result of that choice of the direction of the bounding lines 22 and 25, the radiation spots $S_1$ and $S_2$ will be displaced along the bounding lines when the wavelength is changed so that the signals generated in the detectors and hence the focus error and tracking error signals, do not change when the wavelength is changed. If the detection systems and the laser diode are not coplanar but have a different height, the bounding lines may be directed towards the optical axis of the zero-order beam of the diffraction element 12, i.e., the Z axis in FIG. 3.

FIG. 4A is a plan view of the X-Y plane with the detection system 10 and the projection of the grating 12 on the plane, the detection system and the grating having the same configuration as in the device shown in FIG. 3. The position of the overlap areas is denoted by means of the lines 18 and 19, while the effective track direction 33 is denoted by a broken line. The dividing line angle is the angle of less than 90° between the effective track direction and the dividing line 17. FIG. 4B shows a modification of the configuration of FIG. 4A in which the detection elements 20 and 21 are replaced by a single detector 26. The focus error signal is generated only from the difference signal of the two detection elements 23 and 24, hence in accordance with the single-Foucault method. The configuration of FIG. 4B has the advantage over that of FIG. 4A that the positioning of the grating 12 during assembly of the device is simpler because only one radiation spot is to be located centrally on a bounding line instead of two radiation spots to be located on two different bounding lines. The single-Foucault method of generating the focus error signal is suitable for devices with a stable optical system.

Figure 5:
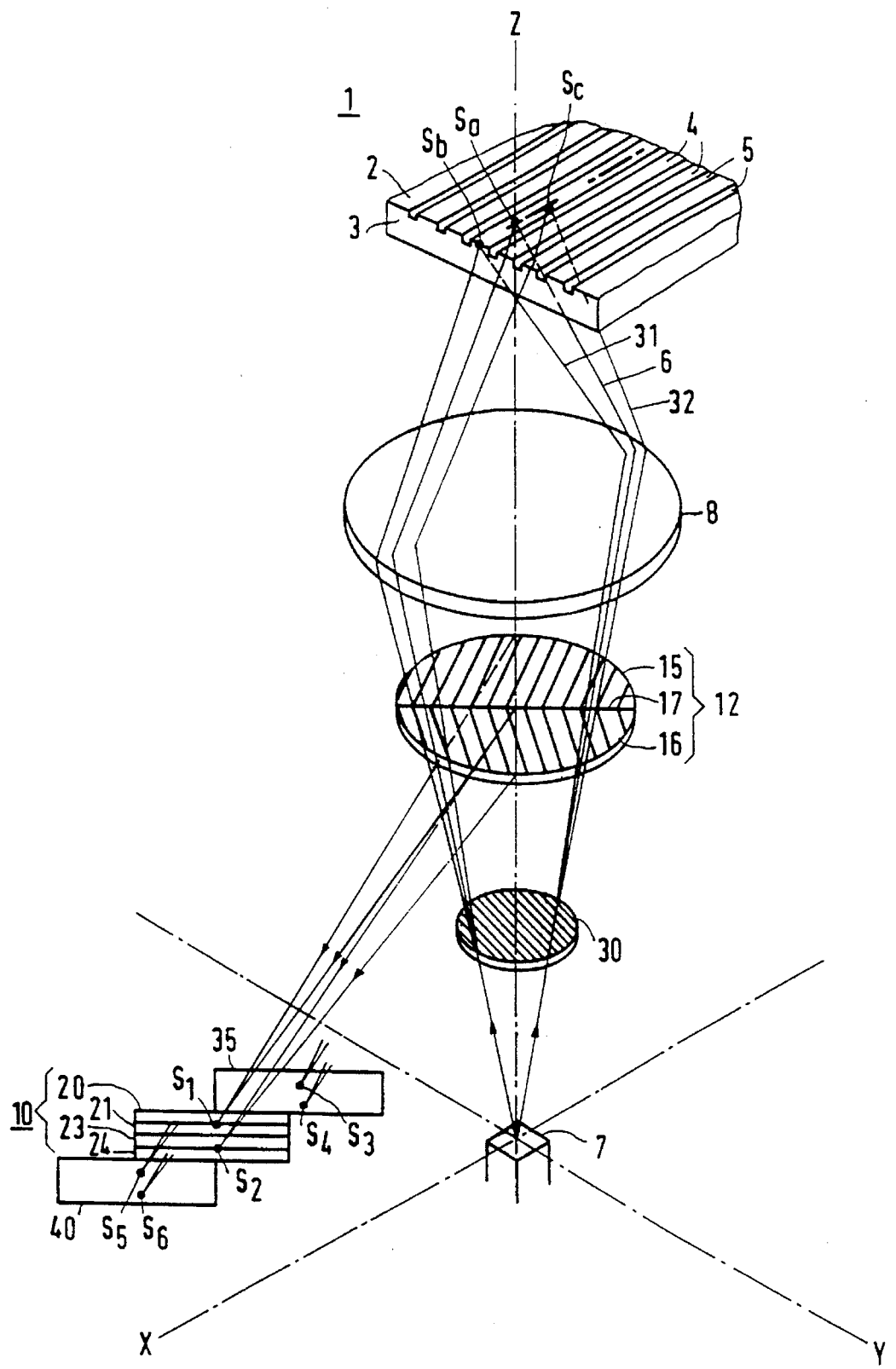
FIG. 5 shows a device according to the invention, having two gratings.

The orientation of the grating 12 according to the invention is also applicable in a device in which the tracking of the scanning spot is realized by means of two extra beams. Such a device is known per se from, inter alia, previously mentioned European Patent Application No. 0 372 629. A device in a accordance with the invention is shown in FIG. 5. The two extra beams in this device are formed by a second diffraction element comprising a single grating 30 which is arranged in the beam supplied by the radiation source 7. The substantially parallel, straight grating lines of the single grating extend at a small angle to the Y axis. The grating diffracts a+$1^{st}$ order beam in approximately the +X direction and a −$1^{st}$ order beam in the -X direction. These +$1^{st}$ and −$1^{st}$ order beams constitute two auxiliary beams 31 and 32 in addition to the $0^{th}$ order beam which is used as scanning beam 6. The auxiliary beams 31 and 32 are focused to two radiation spots $S_b$ and $S_c$ on the information plane 2 by the objective system 8. The two radiation spots extend in the X direction, i.e., the track direction at both sides of the radiation spots $S_a$ formed by the scanning beam 6. Due to the small angle between the Y axis and the grating lines of the single grating, the radiation spots $S_b$ and $S_c$ will have small displacement in the −Y and +Y directions with respect to the radiation spot $S_a$. In the device shown in FIG. 5, the distance in the Y direction between the radiation spot $S_a$ and each one of the radiation spots $S_b$ and $S_c$ is a quarter of the track period. A part of the radiation in the three beams reflected by the information plane is diffracted from the projected beams by the grating 12. To avoid the diffracted beams from being split again by the single grating 30, the gratings 12 and 30 are preferably arranged at such a distance from each other and their dimensions are limited in such a way that the beams diffracted by the grating 12 in the direction of the detection systems do not traverse the grating 30.

The grating 12 treats each one of the reflected beams in the same way as described with reference to FIG. 4. A part of each beam is diffracted in the direction of the detection system 10 and also split into two sub-beams. In the grating 12 shown in FIG. 5, this splitting into sub-beams is realized in a direction perpendicular to the dividing line 17 of the grating. In this way the reflected scanning beam 6 is split to two sub-beams forming the two radiation spots $S_1$ and $S_2$ on the detection system 10. The detection system 10 in FIG. 5 is subdivided into four detection elements 20, 21 and 23, 24, analogous to the device shown in FIG. 4, for generating a focus error signal in accordance with the double-Foucault method. The reflected auxiliary beam 31 is also split into two sub-beams by the grating 12, which sub-beams form two radiation spots $S_3$ and $S_4$ on a detection system 35. The spots $S_3$ and $S_4$ are mutually displaced in a direction perpendicular to the dividing line 17, while with respect to the spots $S_1$ and $S_2$ these spots are offset approximately parallel to the X axis. Analogously, the grating 12 forms two sub-beams from the reflected auxiliary beam 32, which sub-beams form radiation spots $S_5$ and $S_6$ on a detection system 40. Two detection systems 35 and 40 are shown as single detectors each detecting the total radiation in the two radiation spots located thereon. The difference between the detector signal of detection system 35 and that of detection system 40 is a measure of the tracking error of the scanning spot $S_a$ and can be used to keep the scanning spot on the centerline of the track to be scanned.

The orientation of the dividing line 17 of the grating 12 at an acute angle to the direction of the tracks leads to a reduction of the radial to focus crosstalk, likewise as in the device shown in FIG. 4. A further advantage of this orientation of the grating 12 will be elucidated with reference to FIGS. 6A–6D. FIG. 6A is a plan view of the X-Y plane with the detection systems 10, 35 and 40 and a projection of the gratings 12 and 30 on this plane, which detection systems and gratings each individually has a configuration which is substantially similar to corresponding elements in European Patent Application No. 0 372 629. The grating lines of the single grating 30 are again approximately parallel to the Y axis so as to displace the radiation spots $S_b$ and $S_c$ in the X direction with respect to the radiation spot $S_a$. In the known device, the dividing line 17 of the grating 12 is parallel to the tracks. The sub-beams diffracted by the grating 12 yield three pairs of radiation spots $S_1$–$S_6$ located one behind the other in the X direction. The detection systems 10, 35 and 40 for detecting the respective pairs of radiation spots $S_1$ and $S_2$, $S_3$ and $S_4$, $S_5$ and $S_6$ are also located one behind the other in the X direction.

When the wavelength of the radiation emitted by the diode laser 7 is changed, the radiation spots $S_1$–$S_6$ will be displaced in the X direction. The radiation spots $S_1$ and $S_2$ are then displaced along the bounding lines 22 and 25 which are approximately parallel to the X axis. When mounting the different optical components in the device, the focal points of the sub-beams may be located at a different height with respect to the detection systems the design height. The sub-beams may then still, however be focused at the correct height if the grating 12 has an optical strength as is known from European Patent application No. 0 300 570, to which U.S. Pat. No. 4,829,506 corresponds. By displacing the grating 12 in the plane of the grating, the focusing of the sub-beams can be changed. Here again the radiation spots are displaced along the bounding lines. However, the displacement is limited by the length in the X direction of the detection system 10. This length is fixed by the distances between the three pairs of radiation spots on the detection systems which in turn are defined by requirements imposed on the distances between the radiation spots $S_a$, $S_b$ and $S_c$ on the information plane 2. As a result of these requirements, the length of the detection systems cannot be freely chosen and wavelength variations and detector positioning have a small tolerance. In a device according to the invention, the tolerances may be considerably wider due to the orientation of the dividing line 17 of the grating with respect to the tracks.

FIG. 6B shows a configuration according to the invention of the gratings 12 and 30 and the detection systems 10, 35 and 40. Due to the mutual orientation of the gratings 12 and 30 shown in the Figure, the mutual orientation of the radiation spots $S_1$–$S_6$ may be changed in such a way that the detection systems 35 and 40 can be arranged next to the detection system 10 in a direction perpendicular to the connection line between the center of the detection system 10 and the point of convergence of the zero-order beam of the grating 12, i.e., the center of the grating 12 in FIG. 6B. It is now possible to choose the length of the detection systems parallel to the connection line as large as is necessary for positioning tolerances of the detection systems and gratings and for the displacements of the radiation spots due to wavelength changes. The detection systems may be arranged further apart in the case of a larger dividing line angle. At a dividing angle around 45°, the distance between detection systems is large enough to use elongate detection elements, while there is a small crosstalk and a usable tracking error signal can be generated by means of the push-pull method. In FIG. 6B the detection system has two bounding lines 22 and 25 so that a focus error signal can be generated by using the double-Foucault method. It is also, however to generate the focus error signal in this configuration by means of the single-Foucault method. One of the two bounding lines 22 and 25 can then be omitted, as is shown in FIG. 6C. Since only one radiation spot must be located centrally on a bounding line when aligning the optical system, the manufacture of the device is simplified.

The grating lines in the sub-gratings 15 and 16 of the grating 12 need not necessarily be symmetrical with respect to the dividing line 17. FIG. 6D shows a configuration with a grating 12' in which the grating lines in the two sub-gratings are parallel to each other and the period of the grating links in the sub-grating 15' is larger than in the sub-grating 16'. The sub-beams formed by the sub-grating 15' will be diffracted at a smaller angle than the sub-beams formed by the sub-grating 16'. The radiation spot $S_2$ formed by the scanning sub-beam from the sub-grating 16' is therefore located further away from the center of the grating 12' than the radiation spot $S_1$ generated by the scanning sub-beam from the sub-grating 15'. The displacement of the auxiliary beams in the X direction by the single grating 30 ensures that the radiation spots $S_3$ and $S_4$, and $S_5$ and $S_6$ offset in the X direction are located at both sides of the radiation spots $S_1$ and $S_2$. Consequently, the detection systems 10, 35 and 40 may have a larger length in the direction of the point of convergence of the zero-order beam of the grating 12' so that a wide tolerance for positioning the detection systems and for wavelength changes is obtained. The maximum displacement of the radiation spots is determined by the distance between the radiation spots $S_1$ and $S_2$. This distance can be adapted to the required tolerances by modifying the periods of the grating lines in the two sub-gratings 15' and 16'.

The detection system 10 in FIG. 6D has only one pair of detection elements 23 and 24 and one undivided detector and is thus suitable for the single-Foucault method. It is of course alternatively possible to change the configuration of FIG. 6D so as to be suitable for the double-Foucault method by replacing the detector by a pair of detection elements.

For scanning some types of information planes, the tracking error signal generated by means of the two auxiliary beams 31 and 32 described with reference to FIG. 5 is too small to realized a satisfactory tracking. However it is often possible to generate a satisfactory tracking error signal by applying the push-pull method to each one of the two auxiliary beams 31 and 32 and the scanning beam 6. This three-beam push-pull method, also referred to as differential push-pull, is known per se from European Patent Application No. 0 409 469.

Figure 7:
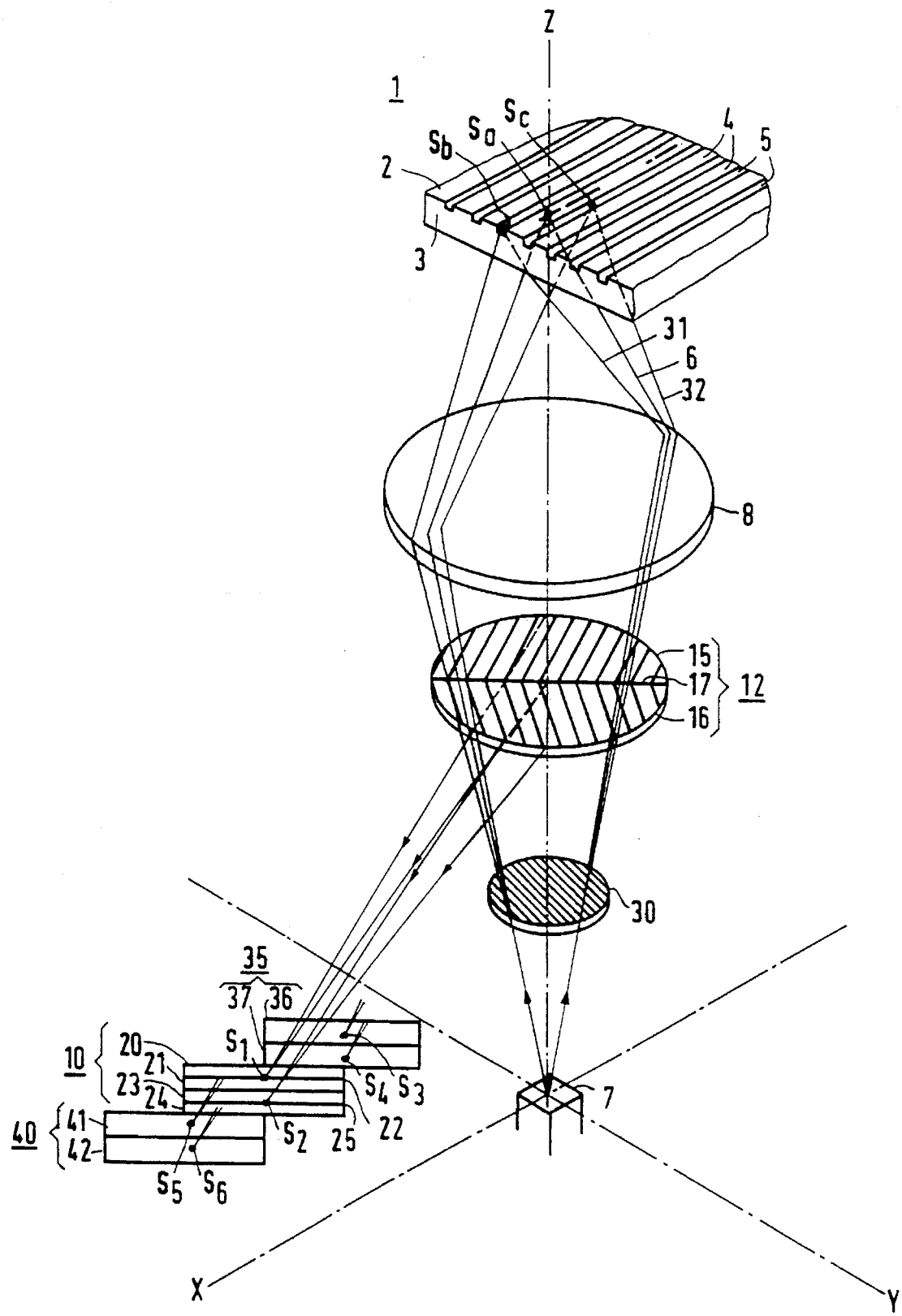
FIG. 7 shows a device having two grating is suitable for the three-beam push-pull method.

FIG. 7 shows a device according to the invention in which the tracking error signal is generated by means of the three-beam push-pull method. The angle at which the grating lines of the single grating 30 extends to the Y axis in this device is chosen to be slightly larger than in the device shown in FIG. 5 so that the radiation spots $S_b$ and $S_c$ on the information plane 2 are located in the Y direction at a distance which is equal to half a track period of the radiation spot $S_a$. A maximum tracking error signal can be generated at this distance between the radiation spots. To be able to detect each radiation spot $S_3$, $S_4$, $S_5$ and $S_6$ individually, each detection system 35 and 40 is divided into two detectors: detectors 36 and 37 and detectors 41 and 42, respectively. The tracking error signal is then given by:

$$S_t' = (S_{36} - S_{37}) + (S_{41} - S_{42}) - C*(S_{20} + S_{21} - S_{23} - S_{24}),$$

in which C is a constant which is dependent on the intensity difference between the scanning beam and the auxiliary beams.

The only bounding line between the detectors in the detection systems 10, 35 and 40 in FIG. 7 which must be accurately oriented due to displacements of the radiation spots in the case of wavelength changes are the bounding lines 22 and 25 of the detection system 10, each dividing a radiation spot in half and with which the focus error signal is generated. If one of these bounding lines is omitted, the focus error signal can be generated by means of the single-Foucault method. The device shown in FIG. 7 has the advantages of a minor radial to focus crosstalk and a wide tolerance for offsets of the radiation spots due to wavelength changes.

For satisfactory tracking it is desired in some devices to locate the radiation spots $S_a$, $S_b$ and $S_c$ relatively close together on the information plane. Consequently, the radiation spots $S_3$, $S_1$ and $S_5$ as well as the radiation spots $S_4$, $S_2$ and $S_6$ on the detection systems in FIG. 7 are located relatively close together. As a result, the separate detectors have to be so narrow that the alignment of the optical system is impeded. Therefore, a detector configuration as shown in FIG. 8 is preferably used in such devices. The three radiation spots $S_3$, $S_1$ and $S_5$ formed by the sub-beams diffracted by the sub-grating 15" are located on the juxtaposed detectors 36, 43 and 41. Likewise, the radiation spots $S_4$, $S_2$ and $S_6$ formed by the sub-beams diffracted by the sub-grating 16" are located on the juxtaposed detectors 37, 34 and 42. In this configuration, the radiation spots may be located closer together than in the detector configuration shown in FIG. 7. The shorter distance between the radiation spots $S_b$, $S_a$ and $S_c$ and consequently of $S_3$, $S_1$ and $S_5$, and of $S_4$, $S_2$ and $S_6$ is realized by using a larger grating period for the grating 30. The larger distance between the radiation spots generated from the same beam is realized by enlarging the angle at which the grating line in each of the sub-gratings 15" and 16" extend to the dividing line 17". This is clearly apparent from a comparison of the gratings shown in FIG. 6B and the gratings shown in FIG. 7.

Figure 9:
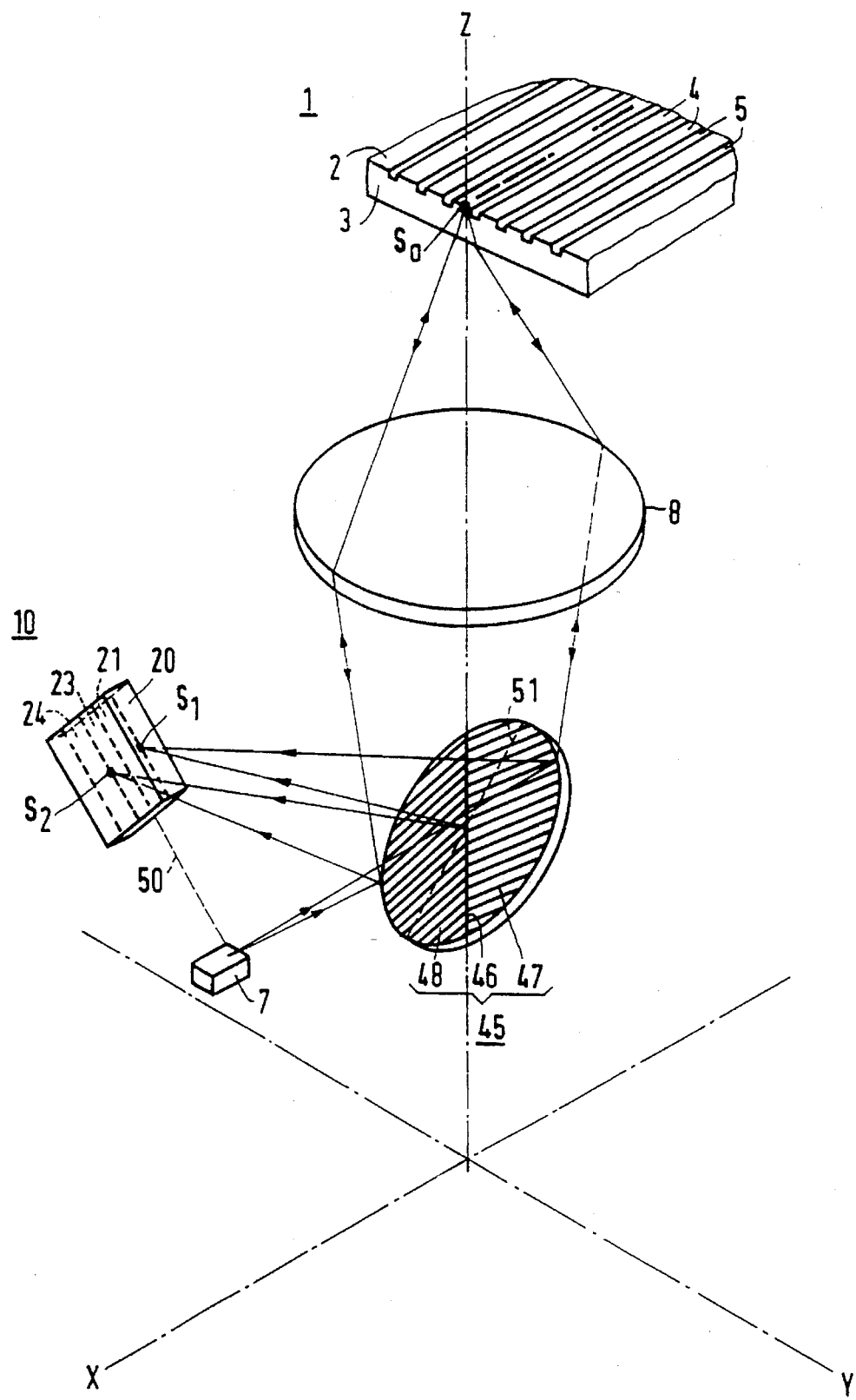
FIG. 9 shows a device with a reflecting grating.

The devices described so far have a grating 12 which is radiation transmissive. However, the present invention is also applicable in a device having a radiation-reflecting grating. An embodiment of such a device is shown in FIG. 9. This device comprises an optical system which is comparable to that of the device shown in FIG. 3. The radiation source 7 supplies a diverging beam with its chief ray parallel to the X axis. The beam is incident on a grating 45 which is arranged at an angle of 45° to the X axis. The beam reflected by the grating subsequently traverses the objective system 8 in the Z direction, which system focuses the beam on the information plane 2. The beam reflected by the information plane is subsequently diffracted in a $0^{th}$, $+1^{st}$ and $-1^{st}$ order by the grating 45. The $0^{th}$ order beam returns to the laser 7 and the two $-1^{st}$ order sub-beams are diffracted towards the detection system 10. The radiation sensitive surface of the detection system 10 and the radiation-emitting surface of the radiation source 7 are located in a plane parallel to the Y-Z plane, offset in the +X direction. The connection line 50 between the center of the detection system and the center of the laser diode extends at an angle of 45° to both the Y axis and the Z axis. The detection system is divided into four detection elements 20, 21, 23 and 24 so that the focus error signal can be generated by means of the double-Foucault method. The grating 45 is divided into two sub-gratings 47 and 48 by way of a dividing line 46. The orientation of the dividing line is shown by means of a broken line indicating the effective track direction 51. The angle between the dividing line 46 and the broken line 51 should be between 15° and 80° according to the invention and is approximately equal to 45° in the Figure. The reflecting grating 45 provides the possibility of a very compact construction of the device. The invention may also be used in a device having a reflecting grating 30 or a device in which the two gratings 12 and 30 are reflecting. It will be evident that all described configurations of the optical system of the device using one and two radiation-transmissive gratings and one or more detection systems may also be constructed with one or two reflecting gratings.

Although the sub-gratings of the gratings 12 and 45 in the embodiments shown in the Figures have straight grating lines, curved grating lines are also possible so as to give the sub-grating, for example, an optical strength.

In the embodiments of the device according to the invention described so far, the sub-beams are generated by means of a grating as a dividing element. However, the invention is also not limited thereto but is applicable in all other devices in which the beam from the information plane is divided into two sub-beams by means of a dividing line. For example, it is possible to use a slightly prismatic dividing plate as a dividing element. Each of the two sub-areas of the dividing element then comprises a face of the prism. The dividing plate is arranged in the beam going towards the detection system. An advantage of the dividing plate is that the direction of the sub-beams is barely dependent on the wavelength of the radiation.

The focus error signal in the devices shown is generated by means of the single or double-Foucault method. The invention is also applicable in devices in which the focus error signal is generated by means of the beam-size method which is known per se from U.S. Pat. No. 4,724,533. The scanning sub-beams 13 and 14 are focused at different distances from the dividing element by giving the sub-areas 15 and 16 a different optical strength.

FIG. 10A shows a dividing element in the form of a prismatic dividing plate 55. The dividing plate has two prism faces 56 and 57 which are separated by dividing line 58. According to the invention, the angle between the dividing line 58 and the effective track direction 51 is between 15° and 80°. The normals on the faces 56 and 57 each extend at a small, opposite angle to the optical axis of the beam incident on the dividing plate. The sub-beams formed by the two faces are deflected from the optical axis likewise at a small deflection angle, dependent on the previously mentioned angle. The deflection angles are only slightly dependent on the radiation wavelength. The sub-beam formed by the prism face 56 is focused above the plane of the detection system 10, while the sub-beam formed by the prism face 57 is focused below the plane. This difference in height of the focal points can be realized by giving the prism faces 56 and 57 different optical strengths, for example, by giving the faces a different curvature. The sub-beam formed by a face 56 forms a radiation spot 59 on the detector 60 comprising three detection elements 61, 62 and 63. The sub-beam formed by the face 57 forms a radiation spot 64 on a detector 65 comprising three detection elements 66, 67 and 68. The detectors 60 and 65 form the detection system 10. The width of the central detection elements 62 and 67 is of the same order of magnitude as the diameter of the radiation spots 64 or 59 if these spots are focused in the plane of the detection system. The Figure shows the situation in which the scanning beam 6 is focused on the information plane 2 and the radiation spots 59 and 64 are equally large. Generally, the dividing plate 55 will be arranged in the beam between a beam splitter and a detection system, the beam splitter deflecting a part of the radiation reflected by the record carrier towards the detection system, and the center of the dividing plate and the detection system will be located on the optical axis of the beam. For the sake of clarity, the detection system and the dividing plate are shown next to each other instead of on top of each other in FIG. 10A. The focus error signal $S_f'$ is then given by:

$$S_f'=(S_{62}+S_{66}+S_{68})-(S_{67}+S_{61}+S_{63}).$$

FIG. 10B shows a dividing element in the form of a diffraction element and an associated detection system for use of the beam-size method in a device as shown in FIG. 3. The diffraction element 70 comprises two sub-gratings 71 and 72 at both sides of the bounding line 73. Each sub-grating has curved grating lines and a different optical strength. The sub-beam formed by sub-grating 71 is focused below the plane of the detection system 10 and forms a radiation spot 75 on the detector 60 comprising two detector elements 76 and 77. The sub-beam formed by a sub-grating 72 is focused above the plane of the detection system 10 and forms a radiation spot 78 on the detector 65 comprising two detection elements 79 and 80. The focus error signal $S_f''$ is given by:

$$S_f''=(S_{77}+S_{79})-(S_{76}+S_{80}).$$

It will be evident that the embodiments of the device in which a focus error signal is generated by means of the beam-size method can be combined with the generation of a tracking error signal in accordance with the push-pull method or by means of two auxiliary beams.

We claim:

1. A device for optically scanning tracks in a radiation-reflecting information plane, the device comprising:

a radiation source for supplying a radiation beam which is a scanning bee or from which the scanning beam is derived;

an objective system for focusing the scanning beam to a scanning spot on the information plane;

a dividing element having two sub-areas, which each has a single grating line structure therein, located symmetrically at both sides of a dividing line thereof and arranged in the optical path of radiation from the information plane for splitting at least a part of the radiation into two scanning sub-beams, the angle between the dividing line and an effective track direction of the tracks projected on the dividing element being between 15° and 80°; and a radiation-sensitive detection system for producing output signals corresponding to the sub-beams for combination into an error signal.

2. The device as claimed in claim 1, wherein the angle is between 30° and 60°.

3. The device as claimed in claim 1, wherein the dividing line is a prismatic dividing plate in which each of the sub-areas consists of a prism face.

4. The device as claimed in claim 1, wherein the dividing element is reflecting.

5. The device as claimed in claim 1, wherein the sub-areas have different optical strengths.

6. The device as claimed in claim 1, wherein the dividing element is a diffraction element in which each of the sub-areas consists of a sub-grating.

7. The device as claimed in claim 6, further comprising a diffraction element, having substantially straight grating lines, arranged in the optical path of the radiation beam between the radiation source and the objective system for splitting the radiation beam emitted by the radiation source into the scanning beam and two auxiliary beams, the auxiliary beams being focused by the objective system to two further radiation spots on the information plane; and two further detection systems, each being associated with a different one of the auxiliary beams after being reflected by the information plane.

8. The device as claimed in claim 7, wherein the further detection systems are located respectively at opposite sides of the detection system in a direction transverse to the perpendicular from the center of the detection system to the optical axis of a zero-order diffraction beam produced by the dividing element.

9. The device as claimed in claim 1, wherein the detection system includes two detectors, at least one of which is divided by a bounding line into two detection elements for detecting one of the sub-beams.

10. The device as claimed in claim 9, wherein the bounding line between the detection elements is directed substantially towards the optical axis of a zero-order diffraction beam produced by the dividing element.

11. A device for optically scanning tracks in a radiation-reflecting information plane, the device comprising:

a radiation source for supplying a radiation beam from which a scanning beam is derived;

an objective system for focusing the scanning beam to a scanning spot on the information plane;

a dividing element having two sub-areas located symmetrically at both sides of a dividing line thereof and arranged in the optical path of radiation from the information plane for splitting at least a part of the radiation into two scanning sub-beams, the angle between the dividing line and an effective track direction of the tracks projected on the dividing element being between 15° and 80°;

a radiation-sensitive detection system for producing output signals corresponding to the sub-beams for combination into an error signal, the detection system including a first and a second detector;

a further diffraction element, having substantially straight grating lines, arranged in the optical path of the radiation beam between the radiation source and the objective system for splitting the radiation beam emitted by the radiation source into the scanning beam and two auxiliary beams, the auxiliary beams being focused by the objective system to two further radiation spots on the information plane; and two further detection systems, each being associated with a different one of the auxiliary beams after being reflected by the information plane, one of the further detection systems including a third and a fourth detector and the other one of the further detection systems including a fifth and a sixth detector;

wherein the six detectors are juxtaposed in the sequence three, one, five, four, two, and six, as viewed in a direction transverse to the perpendicular from the center of the detection system to the optical axis of a zero-order diffraction beam of the dividing element.

12. A device for optically scanning tracks in a radiation-reflecting information plane, the device comprising:

a radiation source for supplying a scanning beam;

an objective system for focusing the scanning beam to a scanning spot on the information plane;

a radiation-sensitive detection system having detection areas disposed on opposite sides of a first dividing line thereof; and a dividing element having two sub-areas located symmetrically at both sides of a second dividing line thereof and arranged in the optical path of a reflected beam of radiation reflected from the information plane for splitting at least a part of the reflected beam into two scanning sub-beams directed towards different ones of the detection areas on the opposite sides of the first dividing line of the detection system, the first dividing line and the second dividing line lying in a same plane and the angle between the second dividing line and an effective track direction of the tracks projected on the dividing element being between 15° and 80°;

wherein the detection system produces output signals corresponding to the sub-beams for combination into an error signal.

13. A device for optically scanning tracks in a radiation-reflecting information plane, the device comprising:

a radiation source for supplying a radiation beam which is a scanning beam or from which the scanning beam is derived;

an objective system for focusing the scanning beam to a scanning spot on the information plane;

a radiation-sensitive detection system having detection areas disposed on opposite sides of a symmetry line thereof; and a dividing element having two sub-areas located symmetrically at both sides of a dividing line thereof and arranged in the optical path of a reflected beam of radiation reflected from the information plane for splitting at least a part of the reflected beam into two scanning sub-beams directed towards different ones of the detection areas on the opposite sides of the symmetry line of the detection system, the symmetrically located sub-areas having respective beam directing effects which are symmetrical with respect to the dividing line, the dividing line and the symmetry line lying in a same plane and the angle between the dividing line and an effective track direction of the tracks projected on the dividing element being between 15° and 80°;

wherein the detection system produces output signals corresponding to the sub-beams for combination into an error signal.

14. The device as claimed in claim 13, wherein the sub-areas have different optical strengths.

15. The device as claimed in claim 13, wherein the dividing element is a diffraction element in which each of the sub-areas consists of a sub-grating.

16. The device as claimed in claim 15, wherein the dividing element further has an additional area arranged in the optical path for forming at least one extra beam.

17. The device as claimed in claim 16, wherein the additional area is a further diffraction element, having substantially straight grating lines, arranged in the optical path of the radiation beam between the radiation source and the objective system for splitting the radiation beam emitted by the radiation source into the scanning beam and two auxiliary beams, the auxiliary beams being focused by the objective system to two further radiation spots on the information plane; and the device further comprises two further detection systems, each being associated with a different one of the auxiliary beams after being reflected by the information plane.

18. The device as claimed in claim 17, wherein the further detection systems are located respectively at opposite sides of the detection system in a direction transverse to the perpendicular from the center of the detection system to the optical axis of a zero-order diffraction beam produced by the dividing element.

19. The device as claimed in claim 17, wherein the detection system comprises two detectors, at least one of which is divided by a bounding line into two detection elements for detecting one of the sub-beams.

20. The device as claimed in claim 19, wherein the bounding line between the detection elements is directed substantially towards the optical axis of a zero-order diffraction beam produced by the dividing element.

21. A device for optically scanning tracks in a radiation-reflecting information plane, the device comprising:

a radiation source for supplying a radiation beam which is a scanning beam or from which the scanning beam is derived;

an objective system for focusing the scanning beam to a scanning spot on the information plane;

a dividing element having only two sub-areas located symmetrically at both sides of a dividing line thereof and arranged in the optical path of radiation from the information plane for splitting at least a part of the radiation into two scanning sub-beams, the angle between the dividing line and an effective track direction of the tracks projected On the dividing element being between 15° and 80°; and a radiation-sensitive detection system for producing output signals corresponding to the sub-beams for combination into an error signal.

* * * * *